United States Patent
Thompson et al.

(10) Patent No.: US 11,128,463 B1
(45) Date of Patent: Sep. 21, 2021

(54) COST-EFFICIENT IOT FORENSICS FRAMEWORK WITH BLOCKCHAIN

(71) Applicants: Michael Thompson, Miami, FL (US); Suat Mercan, Miami, FL (US); Mumin Cebe, Miami, FL (US); Kemal Akkaya, Miami, FL (US); Arif Selcuk Uluagac, Miami, FL (US)

(72) Inventors: Michael Thompson, Miami, FL (US); Suat Mercan, Miami, FL (US); Mumin Cebe, Miami, FL (US); Kemal Akkaya, Miami, FL (US); Arif Selcuk Uluagac, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/215,467

(22) Filed: Mar. 29, 2021

(51) Int. Cl.
| | |
|---|---|
| H04L 29/06 | (2006.01) |
| H04L 9/32 | (2006.01) |
| G06F 16/21 | (2019.01) |
| G06F 16/22 | (2019.01) |
| H04L 9/06 | (2006.01) |
| G16Y 40/10 | (2020.01) |
| H04L 12/40 | (2006.01) |
| G06Q 20/06 | (2012.01) |

(52) U.S. Cl.
CPC ........... *H04L 9/321* (2013.01); *G06F 16/219* (2019.01); *G06F 16/2246* (2019.01); *G16Y 40/10* (2020.01); *H04L 9/0643* (2013.01); *G06Q 20/0658* (2013.01); *H04L 2012/40215* (2013.01); *H04L 2012/40286* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2018/0144156 A1* | 5/2018 | Marin | G06F 21/54 |
| 2020/0169402 A1* | 5/2020 | Zhuo | H04L 9/3239 |
| 2020/0210519 A1* | 7/2020 | Wang | H04L 9/0618 |

(Continued)

OTHER PUBLICATIONS

Ramkumar, Mahalingam. A blockchain based framework for information system integrity. China Communications, vol. 16, Issue: 6. https://ieeexplore.ieee.org/stamp/stamp.jsp?tp=&arnumber=8753459 (Year: 2019).*

(Continued)

*Primary Examiner* — Jeremiah L Avery
(74) *Attorney, Agent, or Firm* — Saliwanchik, Lloyd & Eisenschenk

(57) ABSTRACT

A cost-effective and reliable digital forensics framework is provided by exploiting multiple blockchain networks in two levels. The selected data collected from sensors on a boat is sent to a remote company database and calculated hash of the data is saved in two blockchain platforms in the first level. Hash of each block is retrieved and inserted onto a Merkle tree on a periodic basis to be stored on another blockchain in the second level which is used to detect any error in the first level blockchains. A secure platform is created with the combination of several blockchains.

20 Claims, 6 Drawing Sheets

(56) References Cited

U.S. PATENT DOCUMENTS

2020/0252205 A1* 8/2020 Padmanabhan ...... G06K 9/6256
2020/0252406 A1* 8/2020 Padmanabhan ...... H04L 9/0891

OTHER PUBLICATIONS

Mizrahi, Avi et al. Optimizing Merkle Proof Size for Blockchain Transactions. 2021 International Conference on COMmunication Systems & NETworkS (COMSNETS). https://ieeexplore.ieee.org/stamp/stamp.jsp?tp=&arnumber=9352820 (Year: 2021).*
Wang, Fuqin et al. An Experimental Investigation Into the Hash Functions Used in Blockchains. IEEE Transactions on Engineering Management, vol. 67, Issue: 4. https://ieeexplore.ieee.org/stamp/stamp.jsp?tp=&arnumber=8847331 (Year: 2020).*

* cited by examiner

COST-EFFICIENT IOT FORENSICS FRAMEWORK WITH BLOCKCHAIN

BACKGROUND

IoT devices have been adopted widely in the last decade, which has enabled collection of various data from different environments. The collected data is crucial in certain applications where IoT devices generate data for critical infrastructure or systems whose failure may result in catastrophic results. For such critical applications, data storage poses challenges since the data may be compromised during the storage and the integrity might be violated without being noticed. In such cases, integrity and data provenance are required in order to be able to detect the source of an incident and prove it in legal cases if there is a dispute with the involved parties. To address these issues, blockchain provides excellent opportunities since it can protect the integrity of the data thanks to its distributed structure. However, it comes with certain costs as storing huge amount of data in a public blockchain will come with significant transaction fees.

BRIEF SUMMARY

Embodiments of the subject invention provide cost effective and reliable digital forensics frameworks by exploiting multiple blockchain networks in two or more levels. The selected data collected from sensors at a remote location (e.g., on a boat) is sent to a remote company database and a calculated hash of the data is saved in one or more (e.g., two) blockchain platforms in the first level. The hash of each block is retrieved and inserted onto a Merkle tree on a periodic (e.g., daily) basis to be stored on another blockchain in the second level which is used to detect any error in the first level blockchains. One object of the subject invention is creating a secure platform with the combination of several blockchains.

In an embodiment, a system for verifying authenticity and integrity of data collected from one or more devices during one or more time periods can comprise at least one processor and at least one machine-readable medium in operable communication with the at least one processor, the at least one machine-readable medium having instructions stored thereon that, when executed by the at least one processor, perform certain steps. These steps may include: collecting one or more data entries; encoding, to a primary blockchain, a primary hash created from each data entry, respectively, of the one or more data entries; encoding, to at least one secondary blockchain, a secondary hash of each primary hash, respectively, encoded to the primary blockchain, the secondary hash being encoded as a Merkle root of a Merkle tree comprising each of the primary hashes encoded to the primary blockchain, and the Merkle tree comprising a set of Merkel Path Nodes; and writing, within a database, an individual database entry associating each data entry of the one or more data entries with its respective primary hash, Merkle root, and set of Merkle Path Nodes related to that data entry. These steps may further include: reading, from the database entry within the database, a first data entry of the one or more data entries, the primary hash related to the first data entry, the Merkle root related to the first data entry, and the set of Merkle Path Nodes related to the first data entry; reading, from the primary blockchain, the primary hash created from the first data entry; reading, from the secondary blockchain, the Merkle root encoding the secondary hash related to the first data entry; comparing the primary hash read from the database entry with the primary hash read from the primary blockchain; and comparing the Merkle root read from the secondary blockchain with a Merkle root calculated from the primary hash related to the first data entry, the Merkle root related to the first data entry, and the set of Merkle Path Nodes related to the first data entry.

Embodiments of the subject invention may in some cases be further defined by: the primary blockchain having a measurable primary unit transaction cost, a measurable primary transaction verification time, and a measurable primary security level; the secondary blockchain having a measurable secondary unit transaction cost, a measurable secondary transaction verification time, and a measurable secondary security level; the primary security level being lower than the secondary security level; and either the primary unit transaction cost being lower than the secondary unit transaction cost, or the primary unit verification time being lower than the secondary unit verification time, or both. Embodiments of the subject invention may in some cases be further defined by the primary blockchain being a first primary blockchain and the instructions when executed further performing the following steps: encoding, to a second primary blockchain, a tertiary hash created from each data entry, respectively, of the one or more data entries; reading, from the second primary blockchain, the tertiary hash created from the first data entry; and comparing the primary hash read from the database entry with the tertiary hash read from the second primary blockchain.

In certain embodiments each of the first primary blockchain, the second primary blockchain, and the secondary blockchain may be a public permission-less blockchain allowing open access and initiation of contracts.

In certain embodiments the one or more data entries may include event data generated by one or more sensors.

Embodiments may include an IoT edge device comprising a processor of the at least one processor and configured to communicate with: (1) one or more sensors within a local environment using one or more local communication protocols; and (2) one or more instances of a database or a blockchain hosted in a location remote to the IoT edge device, using one or more remote communications protocols.

In certain embodiments the one or more instances of a database or a blockchain hosted in a location remote to the IoT edge device may include the first primary blockchain, the second primary blockchain, the secondary blockchain, or the database as referenced above. The IoT edge device may be mounted on an operational vehicle or vessel. The one or more local communication protocols may include a Controller Area Network (CAN), and the one or more remote communications protocols ay include a Message Queuing Telemetry Transport (MQTT) protocol. The operational vehicle or vessel may be a boat.

In an embodiment, a method for providing verification of authenticity and integrity of data collected from one or more devices during one or more time periods may include the steps of: providing at least one first processor in operable communication with a data source, a primary blockchain, a secondary blockchain, and a database; collecting, by the at least one first processor, one or more data entries from the data source; encoding, by the at least one first processor, to the primary blockchain, a primary hash created from each data entry, respectively, of the one or more data entries; encoding, by the at least one first processor, to the secondary blockchain, a secondary hash of each primary hash, respectively, encoded to the primary blockchain, the secondary hash being encoded as a Merkle root of a Merkle tree comprising each of the primary hashes encoded to the primary blockchain, and the Merkle tree comprising a set of Merkel Path Nodes; writing, by the at least one first processor, within the database, an individual database entry associating each data entry of the one or more data entries with its respective primary hash, Merkle root, and set of Merkle Path Nodes related to that data entry to create a digital forensics framework; and providing, by the at least one first processor, the digital forensics framework, thereby providing the verification of authenticity and integrity of data collected from one or more devices during one or more time periods. These steps may further include providing at least one second processor in operable communication with the data source, the primary blockchain, the secondary blockchain, and the database; reading, by the at least one second processor, from a database entry within the database, a first data entry of the one or more data entries, the primary hash related to the first data entry, the Merkle root related to the first data entry, and the set of Merkle Path Nodes related to the first data entry; reading, by the at least one second processor, from the primary blockchain, the primary hash created from the first data entry; reading, by the at least one second processor, from the secondary blockchain, the Merkle root encoding the secondary hash related to the first data entry; comparing, by the at least one second processor, the primary hash read from the database entry with the primary hash read from the primary blockchain; and comparing, by the at least one second processor, the Merkle root read from the secondary blockchain with a Merkle root calculated from the primary hash related to the first data entry, the Merkle root related to the first data entry, and the set of Merkle Path Nodes related to the first data entry.

Embodiments of the subject invention may in some cases be further defined by: the primary blockchain having a measurable primary unit transaction cost, a measurable primary transaction verification time, and a measurable primary security level; the secondary blockchain having a measurable secondary unit transaction cost, a measurable secondary transaction verification time, and a measurable secondary security level; the primary security level being lower than the secondary security level; and either the primary unit transaction cost being lower than the secondary unit transaction cost, or the primary unit verification time being lower than the secondary unit verification time, or both.

Embodiments of the subject invention may in some cases be further defined by the primary blockchain being a first primary blockchain, and further performing the following steps: encoding, by the at least one first processor, to a second primary blockchain, a tertiary hash created from each data entry, respectively, of the one or more data entries; reading, by the at least one second processor, from the second primary blockchain, the tertiary hash created from the first data entry; and comparing, by the at least one second processor, the primary hash read from the database entry with the tertiary hash read from the second primary blockchain.

In certain embodiments each of the first primary blockchain, the second primary blockchain, and the secondary blockchain being a public permission-less blockchain allowing open access and initiation of contracts. The one or more data entries may include event data generated by one or more sensors.

The step of collecting one or more data entries may further include collecting one or more data entries from an IoT edge device configured to communicate with: (1) one or more sensors within a local environment using one or more local communication protocols; and (2) one or more instances of a database or a blockchain hosted in a location remote to the IoT edge device, using one or more remote communications protocols.

In certain embodiments the one or more instances of a database or a blockchain hosted in a location remote to the IoT edge device may include the first primary blockchain, the second primary blockchain, the secondary blockchain, or the database as referenced above. The IoT edge device may be mounted on an operational vehicle or vessel.

In an embodiment, a system for verifying authenticity and integrity of data collected from one or more devices during one or more time periods can comprise at least one processor and at least one machine-readable medium in operable communication with the at least one processor, the at least one machine-readable medium having instructions stored thereon that, when executed by the at least one processor, performs a series of steps. These steps my include collecting one or more data entries; encoding, to a first primary blockchain, a primary hash created from each data entry, respectively, of the one or more data entries; encoding, to at least one secondary blockchain, a secondary hash of each primary hash, respectively, encoded to the first primary blockchain, the secondary hash being encoded as a Merkle root of a Merkle tree comprising each of the primary hashes encoded to the first primary blockchain, and the Merkle tree comprising a set of Merkel Path Nodes; writing, within a database, an individual database entry associating each data entry of the one or more data entries with its respective primary hash, Merkle root, and set of Merkle Path Nodes related to that data entry; reading, from a database entry within the database, a first data entry of the one or more data entries, the primary hash related to the first data entry, the Merkle root related to the first data entry, and the set of Merkle Path Nodes related to the first data entry; reading, from the first primary blockchain, the primary hash created from the first data entry; reading, from the secondary blockchain, the Merkle root encoding the secondary hash related to the first data entry; comparing the primary hash read from the database entry with the primary hash read from the first primary blockchain; and comparing the Merkle root read from the secondary blockchain with a Merkle root calculated from the primary hash related to the first data entry, the Merkle root related to the first data entry, and the set of Merkle Path Nodes related to the first data entry; encoding, to a second primary blockchain, a tertiary hash created from each data entry, respectively, of the one or more data entries; reading, from the second primary blockchain, the tertiary hash created from the first data entry; and comparing the primary hash read from the database entry with the tertiary hash read from the second primary blockchain; the first primary blockchain having a measurable primary unit transaction cost, a measurable primary transaction verification time, and a measurable primary security level, the secondary blockchain having a measurable secondary unit transaction cost, a measurable secondary transaction verification time, and a measurable secondary security level, the primary security level being lower than the secondary security level, and (1) the primary unit transaction cost being lower than the secondary unit transaction cost, (2) the primary unit verification time being lower than the secondary unit verification time, or both; each of the first primary blockchain, the second primary blockchain, and the secondary blockchain being a public permission-less blockchain allowing open access and initiation of contracts.

The one or more data entries may include event data generated by one or more sensors, and the system may further include an IoT edge device mounted on an operational boat, the IoT edge device comprising a processor of the at least one processor and configured to communicate with: (1) one or more sensors within a local environment using one or more local communication protocols; and (2) one or more instances of a database or a blockchain hosted in a location remote to the IoT edge device, using one or more remote communications protocols comprising a Controller Area Network (CAN), and a Message Queuing Telemetry Transport (MQTT) protocol. In certain embodiments the one or more instances of a database or a blockchain hosted in a location remote to the IoT edge device may include the first primary blockchain, the second primary blockchain, the secondary blockchain, or the database as referenced above.

DETAILED DESCRIPTION

Figure 1:
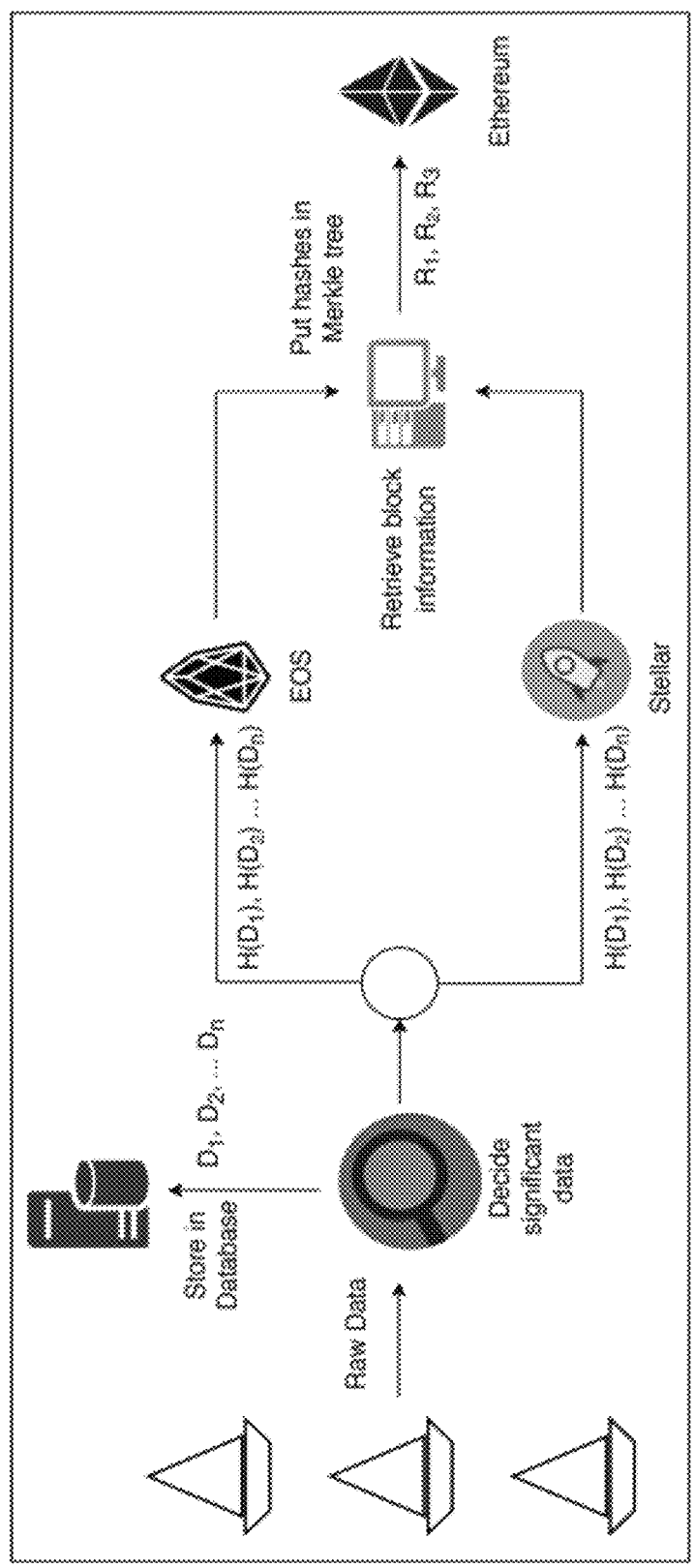
FIG. 1 is a graphic representing the overall system architecture of one embodiment of the subject invention.

Embodiments of the subject invention provide cost effective and reliable digital forensics frameworks by exploiting multiple blockchain networks in two or more levels. The selected data collected from sensors at a remote location (e.g., on a boat) is sent to a remote company database and a calculated hash of the data is saved in one or more (e.g., two) blockchain platforms in the first level. The hash of each block is retrieved and inserted onto a Merkle tree on a periodic (e.g., daily) basis to be stored on another blockchain in the second level which is used to detect any error in the first level blockchains. One object of the subject invention is creating a secure platform with the combination of several blockchains.

Some embodiments of the subject invention provide cost effective and reliable digital forensics frameworks by exploiting multiple blockchain networks in multiple levels (e.g., in two levels.) One or more remote electronic units (e.g., one or more units mounted on a boat or units mounted on multiple boats) collects data from sensors (e.g., engine temperature, geographical position, and other relevant performance or safety data) through a local data network (e.g., a Controller Area Network or CAN bus.) The data collected from sensors may be filtered and selected based on preset criteria. The selected data is sent to a database (e.g., a remote company database) and a calculated hash of the data is saved in the blockchain platform(s) in the first level. Storing the same data on two different platforms increases the resilience by eliminating single point of failure against attacks to blockchains. A computer program (e.g., a computer program residing in company premises, or in a secure cloud platform) retrieves block information from the first level blockchain periodically (e.g., on a daily basis.) Hash of each block is inserted onto a data structure (e.g., a Merkle tree) to be stored on another blockchain in the second level which can be used to detect any error in the first level blockchain(s).

One challenge with traditional forensics mechanisms is the need to maintain an additional trusted authority to ensure the integrity of the data. If the trusted authority is compromised, it provides an intruder with an origin to play with the integrity of the data. In addition, a single trusted authority alone cannot stand for an insider attack when it becomes a target of interest. The subject invention alleviates the trust issue and establishes a trustless setup through novel and advantageous utilization of blockchain technology.

Storing the large amounts of data periodically collected from boats, other vessels, other vehicles, or other remote locations only in the company database may not be accepted as an authentic source of information by other stakeholders in case of a dispute. Certain embodiments of the subject invention provide an independently verifiable source of information by storing the signature of the original data on the blockchain before it is saved in the company database to prove the integrity of the data and convince the authorities.

It is contemplated in accordance with certain embodiments of the subject invention that storing the signature (e.g., the hash) of the data only on a well-known commercial blockchain platform (e.g., Ethereum) will be inefficient in terms of cost. Using a less popular blockchain will be cheaper, however, it is not considered as reliable as a second level blockchain (e.g., Ethereum) because of its lower number of users. The systems and methods of certain embodiments of the subject invention may provide a cost-efficient solution by saving some or all of the detailed incident information in a first level (e.g., less costly) blockchain, while only the signature (e.g., the hash) of the daily summary of some or all transactions is written to a more costly second level blockchain (e.g., Ethereum.) Certain embodiments of the subject invention provide a multi-factor integrity (MFI) system that utilizes one or more lower cost blockchain platforms together with one or more higher cost blockchain platforms to achieve a cost efficient back-up against system failures. It is contemplated in accordance with certain embodiments of the subject invention to increase the resiliency of data in case one of the platforms may be compromised (e.g., discontinued or hacked.) MFI as applied in certain embodiments of the subject invention makes it more difficult for a malicious actor to alter the IoT data stored in the company's database without detection. It is contemplated in accordance with certain embodiments of the subject invention that if one blockchain is compromised or broken, a malicious actor still has at least one or more obstacles which must be overcome to breach the integrity of the data.

Certain embodiments of the subject invention provide higher security and resilience against Q consensus attack, such as a 51% attack and/or single point (blockchain system) of failure. A 51% attack is when a malicious user controls 51% of the capacity and can therefore break the consensus protocol. A single point of failure occurs if data is stored in a single system and that single system fails. It is contemplated in accordance with certain embodiments of the subject invention that the attacker must either hack both blockchain networks in the first level within the same day before the summary is written to one of the blockchains in the second level (e.g., Ethereum), or change data both in the blockchains of the first level, and in the blockchains of the second level. Consensus algorithms make it even more difficult to launch an attack. It is contemplated in accordance with certain embodiments of the subject invention that the number of blockchains in the first level can be increased to cost effectively strengthen the security of the system.

It is contemplated in accordance with certain embodiments of the subject invention to provide a forensics framework for IoT data integrity verification via a multichain approach utilizing multiple relatively affordable blockchain networks (e.g., EOS and Stellar) which may be more cost efficient as compared to more established blockchain networks (e.g., Ethereum and Bitcoin) for temporarily storing the hash of the IoT data before they are permanently stored to a second level blockchain (e.g., Ethereum). To reduce the hash sizes further, certain embodiments of the subject invention may utilize data structures (e.g., Merkle trees) that can represent a number of hashes in a single hash value stored in a tree-like structure, creating a secure platform with the combination of several blockchains which is more powerful than the sum of each individual.

It is contemplated in accordance with certain embodiments of the subject invention that the data collected from an IoT device during predefined events is transferred to the company database. Then, the hash of that data is stored in blockchain ledgers (e.g., EOS or Stellar) which serve as the first security level. At the end of each day, the IoT device or separate collecting computer retrieves the block information from these two platforms and inserts them in a Merkle tree whose roots are written to a second level blockchain (e.g., Ethereum) as a second level security platform.

It is contemplated in accordance with certain embodiments of the subject invention that each boat is equipped with an on-board IoT edge device that can communicate with various sensors within the boat using CAN bus protocol. All the sensor data may not be equally significant (e.g., for a boat rental company) though. Thus, it may not be required to write all of the available data entries to blockchain or even to a database. The data may be filtered out in accordance with certain embodiments of the subject invention based on significance or certain events. For instance, the renters of a boat may be allowed to operate within a specific zone for which the insurance is valid. So, it may not be necessary to transmit the geolocation constantly, but if an accident happens or when the boat goes outside of a designated area, the data increases in importance. When the system decides that a data is important, then it is transmitted to a remote company database by the edge device through a secure protocol and transmission network (e.g., the widely used Message Queuing Telemetry Transport (MQTT) protocol and 4G/LTE communication.) A sample system model is shown in FIG. 1.

FIG. 1 shows raw data originating at one or more remote locations (e.g., on one or more boats) and reviewed (e.g., by an algorithm, a monitoring program, or a human reviewer) at a location (e.g., in a single remote location on each boat; at a distributed location in or adjacent each sensor, IoT edge, or data generation device; or in one or more central locations such as a local, regional, or global company or contract data center) to determine significant data ($D_1, D_2, \ldots D_n$) to be stored in a database (e.g., in a single remote database on each boat, or in one or more central database locations such as a local, regional, or global company or contract data center). The hash of each data segment ($H(D_1), H(D_2), H(D_n)$) is then written to one or more first level blockchains (e.g., written to EOS and Stellar blockchains). The first level block information of the individual data hashes is then retrieved for processing where the hashes are added to a Merkle tree and the roots ($R_1, R_2, R_3, \ldots R_n$) are written to a second level blockchain (e.g., Ethereum).

It is contemplated in accordance with certain embodiments of the subject invention that to perform transactions in each of the mentioned blockchain platforms, their respective nodes must be created. For instance, in certain embodiments an EOS central node is set up to define which nodes may connect through the EOS chain plugin application programming interface (API). Every boat may have a wallet and may use this wallet to connect to the main EOS Network. When there is any interesting (e.g., important, qualifying, or meeting a predetermined standard or criteria) event, an IoT edge device pushes the hash of this value into EOS Blockchain via Central EOS Node. It is possible for each wallet to track all transactions easily in accordance with the subject invention via the history API plugin. Similarly, Stellar wallets may be installed to connect to the Stellar network using their APIs.

In order to reduce data size to be written to public blockchains, certain embodiments of the subject invention employ hash functions along with Merkle tree for reducing costs as follows in an exemplary and non-limiting three-step example.

1) In the first step, the IoT edge device from a boat submits the hash of IoT data to the first level of the multi-chain system. As mentioned, only interesting data is picked (e.g., based on some predefined events or preconditions.) The hash of this data is written to both first level blockchains (e.g., Stellar and EOS) during the day as long as there is interesting data.

2) At the end of each day, a synchronization process starts, and the data center of the rental company fetches the confirmed transactions which were submitted to the first level blockchains. The data center then builds a Merkle tree from confirmed transactions and computes the Merkle root for each.

3) The Merkle root computed in the previous step represents a second level integrity factor. Thus, it is submitted to a more secure and reliable blockchain, a second level blockchain (e.g., Ethereum) and a copy of it is stored in a secure company database to be used during forensic investigations. The second level blockchain is used to keep only the hash of all hashes during a day to save transaction costs.

Certain embodiments of the subject invention use events waiting for API recalls to trigger smart contracts which become ready to be deployed to a second level blockchain (e.g., Ethereum) after checking validity. In response to an event, certain embodiments of the subject invention may provide an interface between wallet, API, and smart contracts. Javascript API connects to the Web3 interface of the second level blockchain client that hosts smart contracts, and triggers the hash deployment event. The triggered function imports the Merkle root data constructed, and creates a transaction for a wallet (e.g., Metamask wallet.) The wallet (e.g., Metamask wallet) broadcasts metadata of the contract to the main second level blockchain (e.g., Ethereum) network via peers, and waits for one miner to put the smart contract into a block.

Certain embodiments of the subject invention provide an Integrity Verification Process. When there is an incident that creates dispute (e.g., a potential disagreement or question regarding who is responsible), certain embodiments of the subject invention may be used to provide verifiable facts which may allow an investigator, auditor, or enforcement official to find out and prove what happened. For example, an insurance company working on a claim or a law enforcement officer working on an accident scene needs to ensure the integrity of the available data. Once the integrity of the data is ensured, the faulty party can be determined with increased confidence. In order to do so, in accordance with certain embodiments of the subject invention, the investigator/officer first accesses the related forensic data that is stored in the data center. The investigator/officer will then need to collect the submitted transactions that contain the hash of the data to the first level blockchains, related Merkle root values and Merkle paths of those transactions, again using systems and/or following methods in accordance with certain embodiments of the subject invention.

Figure 2:
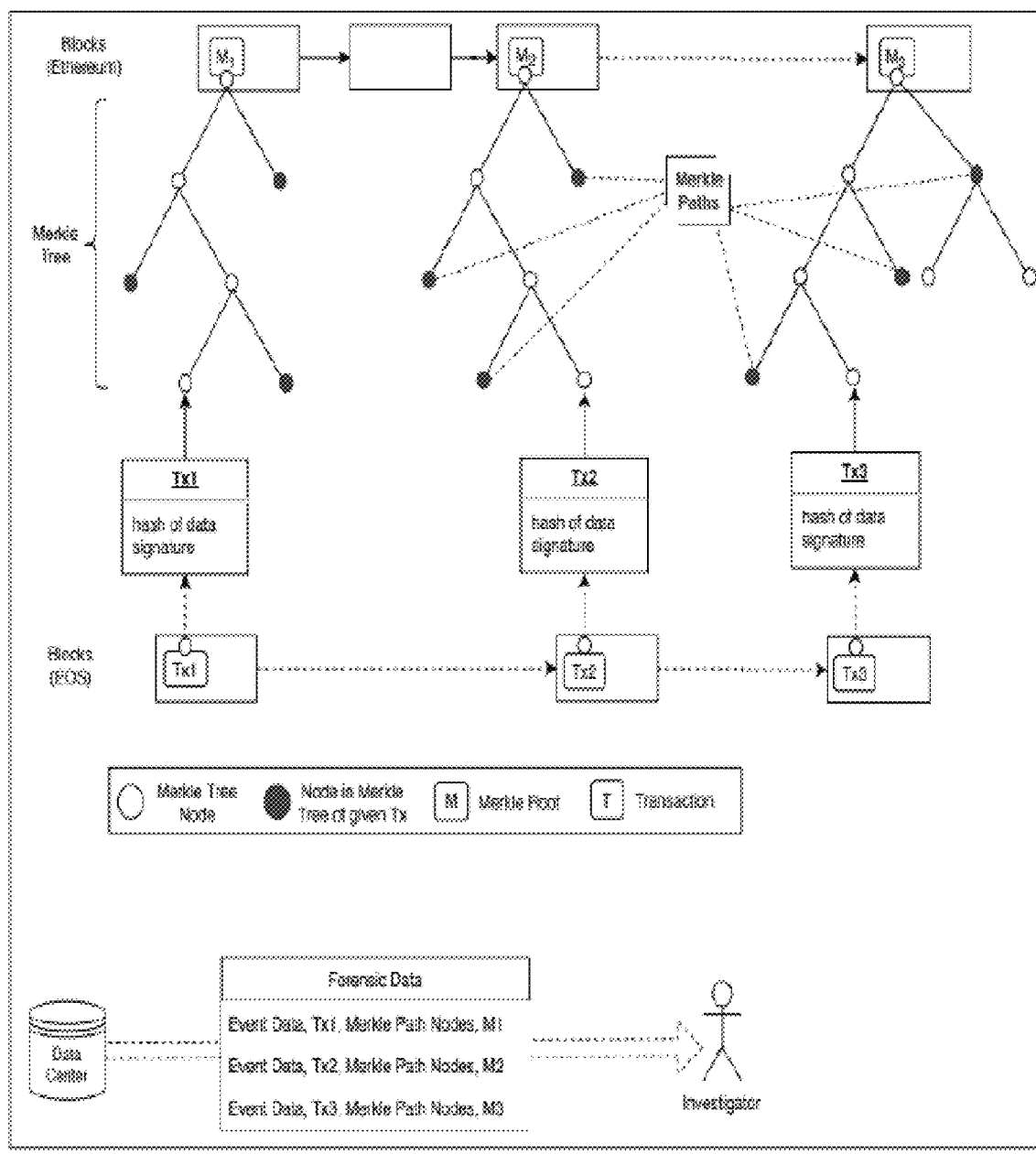
FIG. 2 is a graphic representing the overall data architecture of one embodiment of the subject invention.

The details of a process in accordance with certain embodiments of the subject invention are shown in FIG. 2. In this figure, the data center has a Forensic Data database which contains a row for each event data which includes: 1) the original IoT data; 2) the transaction created with the hash of this data; 3) the Merkle path nodes for this data; and 4) the Merkle root. The Forensic Data is accessed by an Investigator. The hash of each transaction (Tx1, Tx2, Tx3, ... Txn) block (e.g., EOS Blocks) is added to a Merkle tree whose Merkle Root and Merkle Path Nodes ($M_1$, $M_2$, $M_3$, ... $M_n$) are recorded in the database while the hash of the Merkle Roots are written to a second level blockchain (e.g., Ethereum) for validation by the Investigator. A chart legend within FIG. 2 shows Merkle tree nodes as open circles, nodes in Merkle Tree of given Tx as filled circles, Merkle Roots as boxed M's and Transactions as boxed T's.

With respect to Transaction 1 (Tx1), in accordance with an embodiment of the subject invention, this transaction contains the hash of an event data that is already stored in the data center. The investigator/officer can trust the event data if it exists in the first level blockchain. The hash of the event data is computed and this hash is compared with the value in Tx1 in one or more first level blockchains (e.g., EOS and/or Stellar.) The investigator/officer can of course choose to validate the input transactions again on a second level blockchain (e.g., Ethereum) or this process may be automated or included in accordance with certain embodiments of the subject invention. In order to validate Tx1 and ensure that it exists within the Merkle path, the investigator/officer needs to check whether the provided Merkle root which contains the Tx1 and given Merkel root M1 is equal to the value stored in a second level blockchain (e.g., Ethereum). This may be accomplished according to certain embodiments of the subject invention by computing the hash of Tx1 that acts as a node in the Merkle tree provided by the database at the company controlled data center. With the given nodes in the Merkle path, the investigator/officer can simply and very quickly calculate M1 (i.e., the Merkle root to which Tx1 belongs) by a series of hash operations (e.g., with a simplified verification (SV) method) in accordance with the subject invention as described herein. If the Merkle root calculated by the investigator is equal to the provided M1, the investigator ensures that the path in the Merkle tree is correct and Merkle root M1 contains Tx1. If the computed Merkle root and the value which is saved in the second level blockchain matches, the investigator/officer knows with certainty that the data center has given him/her a valid and tamperproof IoT hash data. The investigator/officer also knows that the existence of the transaction in the blockchain has been validated by different multi-chain miners and that there is an extensive proof of work (PoW) computation time ensuring the integrity of the hash data in the multi-chain system.

In certain embodiments the subject invention provides a cost efficient and reliable storage of critical data on blockchain. While certain embodiments may be designed specifically to handle data from IoT devices on a boat, and certain examples within this disclosure may illustrate applications related to boats or shipping, the scope of the subject invention is such that it may be applied in various and diverse cases to verify the integrity of information to resolve a dispute among stakeholders. Insurance companies or car rental companies are some potential customers. The systems of embodiments of the subject invention may be utilized by anyone who needs to store sensitive information in a secure and trustworthy way, including for example forensic applications. For example, a police camera can store the hash of a video record; a logistics company can store certain information about products, transport conditions such as temperature; and any third parties managing critical infrastructure such as power, water, and nuclear plants can record certain sensor data for monitoring control operations.

While certain references, discussions, and examples throughout the specification may be drawn to boats, onboard sensors or networks, boat rental companies, company databases, and the like; the subject invention is not limited thereto. It is within the scope of the subject invention to collect data from multiple sources including but not limited to boats, cars, planes, trucks, trains and other modes of transport, medical, healthcare, business/facility/equipment insurance, agriculture, or hospitality industry devices, computing, network, or communications devices, energy generation or distribution devices, infrastructure, and facilities, financial institutions, government agencies or facilities, or any other data source.

While certain references, discussions, and examples throughout the specification may be drawn to IoT edge devices, on board computing devices, local servers, company servers, cloud servers, company databases, and the like; embodiments of the subject invention are not limited thereto. It is within the scope of embodiments of the subject invention to include hardware from different sources and locations, to process some or all steps on multiple different processors, and to store and retrieve data to and from varying locations. Common computing and communications resources may be used where beneficial to complete multiple steps either together or asynchronously at a central location. Conversely, different and varied computing and communications resources may be used where beneficial to complete individual steps or groups of steps within the spirit of embodiments of the subject invention. All steps contemplated within the subject invention may be accomplished with varying levels of automation or human guidance, and correspondingly widely varying levels of scale and occurrence.

While certain references, discussions, and examples throughout the specification may refer to database rows, Merkle trees, specific commercial instances of blockchain providers, and the like; embodiments of the subject invention are not limited thereto. It is within the scope of the subject invention to include database entries, rows, columns, tables, and other data structures known in the art as beneficial to applications of embodiments of the subject invention. Merkle trees specifically, and hash trees in general, may be applied with blockchain or alternative forms of cryptography. A Directed Acyclic Graph (DAG), which is an alternative to blockchain, can also be used with embodiments of the subject invention (see also Popov, The tangle, White paper 1, 2018: 3; which is hereby incorporated by reference herein in its entirety.)

Certain embodiments of the subject invention provide a highly cost effective and reliable digital forensics framework by exploiting multiple inexpensive blockchain networks as a temporary storage before the data is committed to a second level blockchain (e.g., Ethereum). In order to reduce second level blockchain costs, certain embodiments of the subject invention utilize Merkle trees which hierarchically stores hashes of the collected event data from IoT devices. Certain embodiments the subject invention may be evaluated or discussed in the context of popular blockchains such as EOS, Stellar, Bitcoin, and Ethereum by presenting a cost and security analysis to confirm that certain embodiments of the subject invention can achieve significant cost savings without compromising the integrity of the data. Such evaluations and discussions should not limit the scope of the invention.

The advancement in communication technologies, sensing items, and affordable computing devices has led us to the age of internet of things (IoT) which enables collecting diverse ambient data and communicate it to remote locations as discussed in Ashton (That 'internet of things' thing. RFID journal, 22(7), pp. 97-114, 2009), which is hereby incorporated by reference herein in its entirety. IoT is becoming the de facto technology in many domains including transportation, energy, healthcare, agriculture, hospitality, etc. as discussed in Bandyopadhyay et al. (Internet of things: Applications and challenges in technology and standardization. Wireless personal communications, 58(1), pp. 49-69, 2011), which is hereby incorporated by reference herein in its entirety. In these applications, the data collected from various IoT devices are used to conduct extensive analytics to make informed decisions and take actions. In some scenarios, however, the data is very crucial to run critical infrastructure (i.e., power systems, transportation) and understand failures when they occur. In particular, if there are failures due to human errors or deliberate attacks, it is utmost important to be able to detect the cause of these failures and hold involved parties responsible. Therefore, the secure transmission and storage of IoT data is critical for such purposes.

This necessitates mechanisms to be able to store IoT data for digital forensics investigation purposes. As the data needs to be presented as evidence in case of factual inquiries or disputes, there is a need for trustworthy storage which cannot be deleted or modified. Emerging Blockchain technology can be an excellent fit for such scenarios since it can provide authenticity verification, data provenance, and data integrity as discussed in Li et al. (The internet of things: a survey. Information Systems Frontiers, 17(2), pp. 243-259, 2015), which is hereby incorporated by reference herein in its entirety. Blockchain comes with a distributed ledger technology which can run consensus algorithms among peers to enable transactions in trustless environments. This eliminates the need for a central authority and thus provides a distributed trust. Indeed, with such features Blockchain technology as discussed in Nakamoto (Bitcoin: A peer-to-peer electronic cash system. Technical Report, https://bitcoin.org/bitcoin.pdf, 2008), which is hereby incorporated by reference herein in its entirety, has opened doors to many novel applications in various domains as discussed in Crosby, et al. (Blockchain technology: Beyond bitcoin. Applied Innovation, 2(6-10), p. 71, 2016), which is hereby incorporated by reference herein in its entirety. Among these, forensic investigations, healthcare, insurance business etc. as discussed in Li et al. (supra.) are of interest since there is a need to prove that the stored data has not been tampered with after it was saved.

As a more specific example, let us consider rental businesses and insurance industry which can rent cars or boats. When a person rents a vehicle or any other asset, a dispute might occur among the stake-holders in case of an accident, failure or illegal usage. The renter must operate the vehicle by complying with the regulations, and an insurance company may want to ensure that they are covering only what they are responsible for. The insurance companies have to deal with fraudulent claims valued at millions of dollars every week as discussed in Association of British Insurers ("The con's not on—Insurers thwart 2,400 fraudulent insurance claims valued at £25 million every week,"; last accessed: Sep. 14, 2018. [Online]. Available: https://www.abi.org.uk/news/news-articles/2017/07/the-consnot-on-insurers-thwart-2400-fraudulent-insurance-claims-valued-at-25-million-every-week, 2018), which is hereby incorporated by reference herein in its entirety. The company must validate if the preconditions of the policy are met. In order to establish a ground where everyone is held accountable fairly, the data generated by sensors and/or IoT devices must be recorded timely, stored transparently and securely. Certain embodiments of the subject invention utilize blockchain technology to address this issue.

According to certain embodiments the subject invention, a permissioned blockchain (i.e., a private blockchain network) can be created that allows only certain entities to join the network where some untrusted parties can exchange information. Stakeholders included but not limited to users, rental company, renter, insured and insurance company can become part of this private blockchain network. However, this approach brings undesirable overhead in terms of managing the private ledger. In addition, the security of a private blockchain depends on the number of users and small ones could be risky and vulnerable to attack in terms of consensus. Thus, it is an object of certain embodiments of the subject invention to use a public blockchain to reduce or eliminate the management overhead and increase trust.

However, in the case of public blockchain, there is the challenge of costs with transactions. This is particularly the case with popular blockchain networks such as Ethereum or Bitcoin. If huge amounts of data is to be written to these public ledgers, this may annually cost a lot of money even for Ethereum which is much more affordable compared to Bitcoin as evidenced by publicly available market data, (e.g., www.coinbase.com/price.) In addition, cost increases dramatically as the number of IoT devices writing to blockchain increases. While it is possible to use other less costly ledger platforms instead of Ethereum or Blockchain, their reliability will be much less since these ledgers may not have enough nodes and thus attacks (e.g., 51% attack) may be performed with less effort. Therefore, one objective of the subject invention is to provide cost-effective mechanisms to store IoT data in public blockchains.

Certain embodiments of the subject invention provide a forensics framework for IoT data integrity verification by proposing a multi-chain approach utilizing multiple relatively affordable blockchain networks such as EOS (eos.io/) and Stellar (www.stellar.org/) (which are relatively more affordable compared to Ethereum and Bitcoin) for temporarily storing the hash of the IoT data before they are permanently stored to a second level blockchain (e.g., Ethereum or Bitcoin). To reduce the hash sizes further, certain embodiments of the subject invention may utilize Merkle trees that can represent a number of hashes in a single hash value stored in a tree-like data structure, creating a secure platform with the combination of several blockchains which makes it more powerful than the sum of each individual.

According to certain embodiments of the subject invention, as the data is collected from an IoT device during predefined events, selected data is transferred to a company database. Then, the hash of that data is stored in first level (e.g., EOS and Stellar) blockchain ledgers, which serves as the first security level in one representative framework. At the end of each day, the IoT device retrieves the block information from these two platforms and inserts them in a Merkle tree whose roots are written to a second level blockchain (e.g., Ethereum) as a second level security platform. Certain advantages of this approach include cost-efficiency improvements achieved by saving some or all of each individual incident information in one or more less expensive first level blockchains and saving only a periodic (e.g., hourly, daily, or weekly depending on data volume and communication availability) summary of all transactions in a second level blockchain. Other advantages of certain embodiments of the subject invention include higher security and resiliency against attacks (e.g., 51% consensus attack) (see Baliga, Understanding blockchain consensus models, Persistent 4, 1-14, 2017; which is hereby incorporated by reference herein in its entirety). The attacker must hack both blockchain networks in the first level within the same day before the summary is written to a second level blockchain, or has to change data both in a second level blockchain and one of the blockchains in the first level. The multiple respective blockchain consensus algorithms make it even more difficult to launch an attack. In accordance with certain embodiments of the subject invention, the number of blockchains in the first level or in the second level can be increased to further strengthen the security of the system. Certain embodiments of the subject invention can reduce the costs by more than 10 orders of magnitude.

In the discussion of blockchain utilization for data integrity verification, Olufowobi et. al. (Data provenance model for Internet of Things (IoT) systems. In International Conference on Service-Oriented Computing (pp. 85-91). October, 2016. Springer, Cham, 2016) and Polyzos et al. (Blockchain-assisted infor-mation distribution for the Internet of Things. In 2017 IEEE International Conference on Information Reuse and Integration (IRI) (pp. 75-78). August, 2017, IEEE), each of which is hereby incorporated by reference herein in its respective entirety, focus on generic blockchain-based data provenance infrastructure for IoT generated data. Cebe et al. (Block4forensic: An integrated lightweight blockchain framework for forensics applications of connected vehicles. IEEE Communications Magazine, 56(10), pp. 50-57, 2018), which is hereby incorporated by reference herein in its entirety, suggests a framework for car accident scenarios to save data in blockchain when an accident happens, using a simplified public key infrastructure tailored for vehicular networks to preserve privacy. The data saved in blockchain is used to solve any dispute among the insurer, owner and manufacturer. Gipp et al. ("Securing Video Integrity Using Decentralized Trusted Timestamping on the Bitcoin Blockchain." In MCIS, p. 51, 2016), which is hereby incorporated by reference herein in its entirety, implemented a similar approach on smartphones which is used as dashboard camera in cars. Once smartphone detects an accident via accelerometer sensor, it starts recording the scene and calculates the hash at the end to be written to the public blockchain. In order to keep the cost to minimum, Gipp et al. (supra.) store the aggregation of the hashes. In order to prove that the video stored on the phone has not been changed, the user can provide the original video with the hash. Tian et al. (Block-DEF: a secure digital evidence framework using blockchain. Information Sciences, 491, pp. 151-165, 2019), which is hereby incorporated by reference herein in its entirety, discusses a secure digital evidence framework using blockchain to store evidence and evidence information separately. In order to avoid data bloat, Tian et al. (supra) propose a lightweight blockchain design which they claim is a scalable framework to keep the evidence safe and tamper-proof. Liang et al. (Provchain: A blockchain-based data provenance architecture in cloud environment with enhanced privacy and availability. In Proceedings of the 17th IEEE/ACM international symposium on cluster, cloud and grid computing (pp. 468-477). May, 2017, IEEE Press), which is hereby incorporated by reference herein in its entirety, discusses data assurance for the collected data through IoT sensors which calculate the hash of the data and store it on the blockchain network instead of storing the whole data. In addition to hash-based storage certain embodiments of the subject invention utilize Merkle trees to further save space and certain embodiments of the subject invention use multiple low-cost blockchain networks collaboratively to increase the reliability and security while keeping the cost lower.

The following paragraphs discuss several concepts helpful in understanding differing aspects of the subject invention. These include blockchain, Ethereum, Stellar, Ethereum Operating System (EOS), smart contract, Merkle Tree, and simplified verification (SV). Each of these is discussed in the context of the current state of public knowledge as of the filing of this application.

Figure 3:
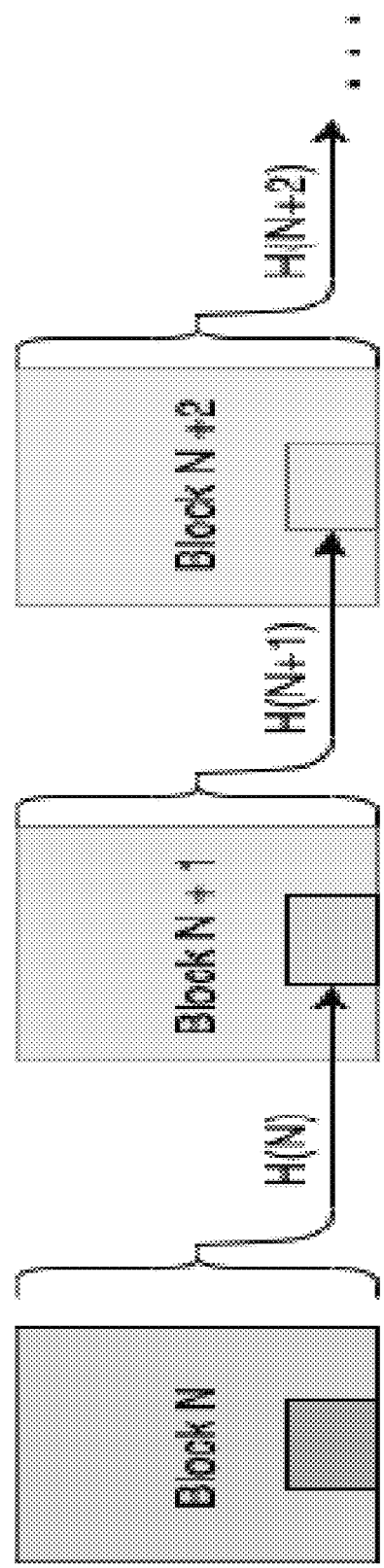
FIG. 3 is a graphic representing a blockchain structure in accordance with one embodiment of the subject invention.

Blockchain is a list of records called blocks, first proposed by Satoshi for Bitcoin as discussed in Nakamoto (supra.), which became popular quickly in the world. The aim is providing decentralized trust. Blockchain technology is a combination of various technologies such as cryptographic hash algorithms, peer-to-peer (P2P) distributed network data sharing, digital signatures, and Proof of Work (PoW) consensus protocol. As utilized in accordance with certain embodiments of the subject invention cryptographic hash algorithms provide data integrity and Blockchain uses this feature to bind chains together by their hash values as shown in FIG. 3. FIG. 3 shows how the hash of each block (H(N) for Block N) is stored within the next block (H(N) from Block N is stored within Block N+1; H(N+1) from Block N+1 is stored within Block N+2; H(N+2) from Block N+2 may be stored within Block N+3; etc.). A P2P distributed network model provides decentralized communication among nodes. With digital signatures, nodes can manage their assets and prove their possession without relying on a central authority. PoW consensus protocol in Blockchain technology guarantees randomness and decentralized reward election.

Blockchain can be used to implement tamper resistant data storage. Once a data element is deployed into the blockchain, it is almost impossible to change this data in large size blockchain networks such as Bitcoin and Ethereum. These networks have thousands of nodes (e.g., 115,000 for Ethereum and 100,000 for Bitcoin in 2020) for storing data into their own ledgers. If any malicious person wants to change the data in these ledgers, it may be necessary to change at least 51% of the nodes. This attack is referred to as a 51% attack herein. This feature provides a high level of data integrity.

Figure 4:
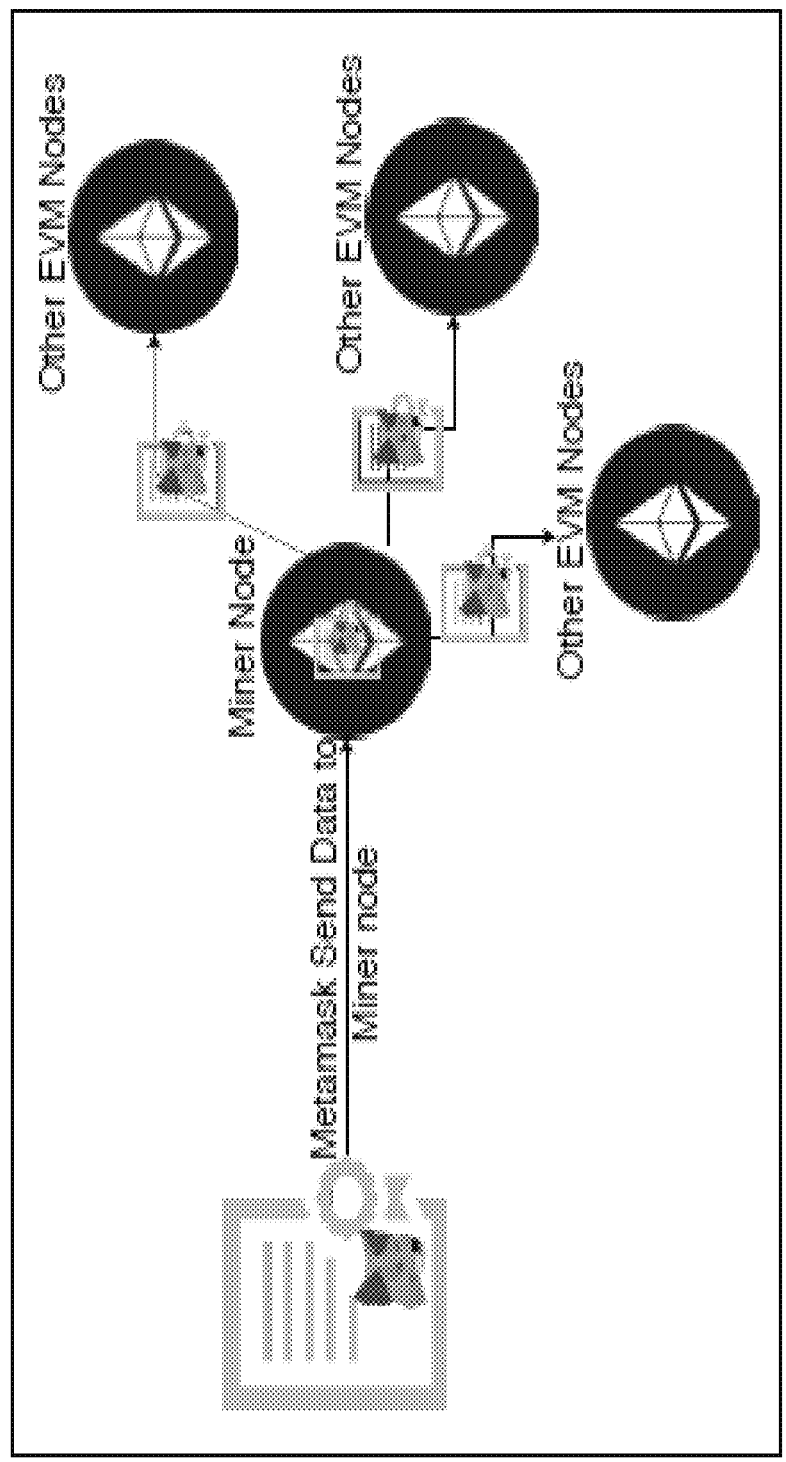
FIG. 4 is a graphic representing an Ethereum node structure in accordance with certain embodiments of the subject invention.

Ethereum as discussed by Wood (Ethereum: A secure decentralised generalised transaction ledger. Ethereum project yellow paper, 151(2014), pp. 1-32), which is hereby incorporated by reference herein in its entirety, is the most widely used and trustable Smart Contract oriented Blockchain network in the world. It is a public, permission-less blockchain which means that anyone can access the information on Ethereum and initiate transactions on their own. It was built as a platform for people to develop decentralized applications easily. Instead of storing monetary transactions in the blocks, one can store smart contracts, or code snippets, in the blocks as seen in FIG. 4. Ethereum uses solidity programming language for creating contracts which are compiled by Ethereum virtual machine (EVM). FIG. 4 shows a Metamask Send Data to Miner node action, and one or more (e.g., three) instances of the Miner Node sending Metamask data to an additional EVM node. Every contract has a gas fee that is calculated based on the contract's memory space and total workloads. It becomes more expensive when the data size gets bigger. Ethereum currently uses PoW consensus algorithm like Bitcoin but Ethereum's block frequency is between 10-20 seconds since its hash puzzles are much easier to solve. Thus, Ethereum generates blocks faster and has higher throughput.

Stellar (www.stellar.org) was the first smart contract oriented blockchain network which aims to provide a scalable payment gateway for users. Stellar is very scalable as its block/contract mining time is around 3-5 seconds. It can confirm thousands of transactions per second. Stellar uses gossip network-based voting algorithm, named Stellar Consensus Algorithm, for consensus in the blockchain network. The development team also provides a wide range of API/SDK to make better development in Stellar blockchain. Finally, multi-signature enabled smart contracts are beneficial for multi-user applications. Lumen is used as a cryptocurrency in Stellar blockchain network. Due to Lumen's low currency exchange rate, the contract creation and deployment fees are so low making Stellar an affordable blockchain option.

EOS (eos.io/) is a well-known and efficient Blockchain Network. Its name comes from Ethereum Operating System (EOS). EOS uses delegated proof of stake as a consensus protocol that provides high efficiency and low energy consumption. Deploying smart contract to EOS network is easy and free but the contract creator should hold some amount of EOS, CPU, and RAM to use EOS bandwidth efficiently. One central EOS full node is enough for multiple wallets.

Smart contracts are pieces of code that are executed by virtual machines which are run in all full blockchain nodes in the network. These Virtual machines are generally compilers which collaborate with the public ledger of the node. When the contract creator deploys a smart contract, the metadata of this smart contract is broadcast to all nodes in the network and becomes un-erasable. The way these smart contracts can be used varies based on the platform. Smart contracts can be utilized to implement various use cases by eliminating third parties. For instance, people can exchange any asset such as a vehicle without involving the government authority since they can prove the ownership of this vehicle by using the records on the distributed ledger. Other use cases include rule-based transactions which are achieved using some if and else statements in these contracts. It is contemplated within the scope and future application of certain aspects of the subject invention that the smart contract concept has great to potential to ease some daily operations though governments and other relevant bodies may not have sufficient regulation yet for smart contract uses.

Figure 5:
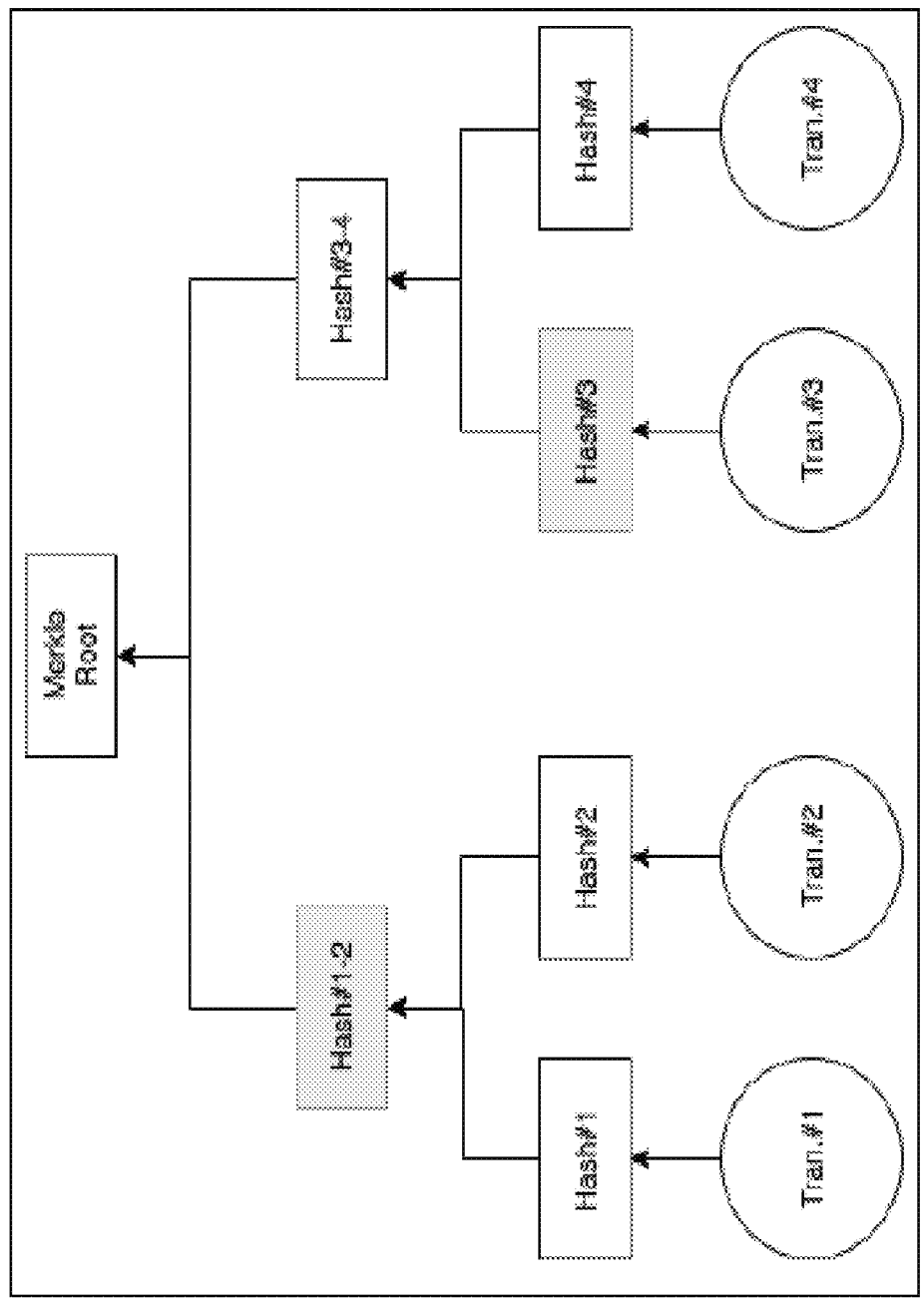
FIG. 5 is a graphic representing a Merkle tree in accordance with certain embodiments of the subject invention.

A Merkle tree as discussed in Merkle ("Method of providing digital signatures." U.S. Pat. No. 4,309,569. 5 Jan. 1982), which is hereby incorporated by reference herein in its entirety, is a fundamental data structure that allows effective and reliable verification of content in a huge collection of data. This structure serves to check the consistency and content of the data. A Merkle tree compiles all the data in a tree by producing a digital fingerprint of the entire set, thereby allowing any actor to verify whether or not a specific node is included in the tree. Merkle trees are formed by repeatedly hashing nodes until there is only one hash left, which is called Merkle Root as seen in FIG. 5. The hashing is conducted from the bottom up, starting from hashes of individual data points, each leaf node in the tree is a different hash of data point, and each non-leaf node is a hash of its two separate roots of its sub-trees. A Merkle tree is actually a perfect binary tree structure which requires an even number of leaf nodes. Thus, when the number of individual data points is odd, the last data point is duplicated to produce an even number of leaf nodes.

One of the essential differences of a Merkle tree from a basic hash-list is that branches can be fetched independently. As a result, the integrity of each branch can be verified independently. This is beneficial because records can be split up into small data chunks such that only a small piece needs to be fetched to verify the integrity of any leaf node. This process is called simplified verification (SV) and proves that particular transactions are included in a Merkle tree without downloading the entire tree.

As an example consider SV of Tran. #4 in the Merkle tree given in FIG. 5, showing a Merkle Tree. In FIG. 5, four transactions (e.g., Tran. #1, Tran. #2, Tran. #3, Tran. #4) on the bottom row are each input to 4 hashes (e.g., Hash #1, Hash #2, Hash #3, Hash #4) on the second row up from the bottom and each pair of hashes produce another hash on the third row up from the bottom (e.g., Hash #1 and Hash #2 each input to Hash #1-2; and Hash #3 and Hash #4 each input to Hash #3-4) where then each pair of hashes on the next (e.g., third) row are combined until on the last (e.g., fourth) row a single Merkle Root is produced by the two hashes from the row below. If a verifier wants to check whether Tran. #4 is included in the Merkle tree, it just needs to fetch the shaded hash values in the tree (i.e., Hash #1-2 and Hash #3). Using these hash values, the verifier can re-compute the Merkle root and compare with the given Merkle root as follows in this four-step example.

1) The verifier aggregates Hash #3 (given) and hash(Tran #4) which is available to derive Hash #4.

2) The verifier aggregates the given Merkle path node, Hash #1-2 and Hash #4 to derive Hash #3-4.

3) The verifier aggregates Hash #3-4 with the given Hash #1-2 to derive the Merkle root.

4) The obtained Merkle root is compared with the given Merkle root. If they match, the verification is complete.

Consequently, the Merkle tree significantly reduces the amount of data in a verification process. It provides a unique mechanism to provide a validation process without requiring the whole data itself. For instance, to prove that a continuously growing transaction log is complete and intact, the Merkle tree provides a lightweight verification method which includes all previous transactions. The verification ensures no previous transactions have been altered, and the tree has never been branched. Because of this unique verification, Merkle tree benefits both provers and verifiers. A prover can compute hashes progressively, as it collects new transactions. A verifier can verify a transaction individually by checking individual hashes of other branches of the tree.

It may be useful to consider embodiments of the subject invention in the context of a system and threat model. Certain embodiments of the subject invention consider a system monitoring a commercially relevant transaction or group of transactions such as a boat rental application where boats are rented to renters by a boat rental company and their data are collected via on-board sensors. Each boat may be equipped with an on-board IoT edge device that can communicate with various sensors within the boat using one or more communication protocols (e.g., CAN bus protocol). All the sensor data may not be equally significant for the rental company and thus it is in some cases not required to write all of the data elements to blockchain or even to a database. The data may be filtered out based on significance or certain events. For instance, the renters are allowed to drive within a specific zone for which the insurance is valid. So, it may not be necessary to transmit the geolocation constantly, but if an accident happens or when the boat goes outside of designated area, the data becomes important and may be designated in accordance with certain aspects of the subject invention for transmission, storage, hashing, or writing into the blockchain based on one or more events, locations, thresholds, tests, categories, or rules. When the system decides that a data element is important, then it is transmitted to a remote company database by the IoT edge device (e.g., through the widely used Message Queuing Telemetry Transport (MQTT) protocol and 4G/LTE communication.)

Figure 6:
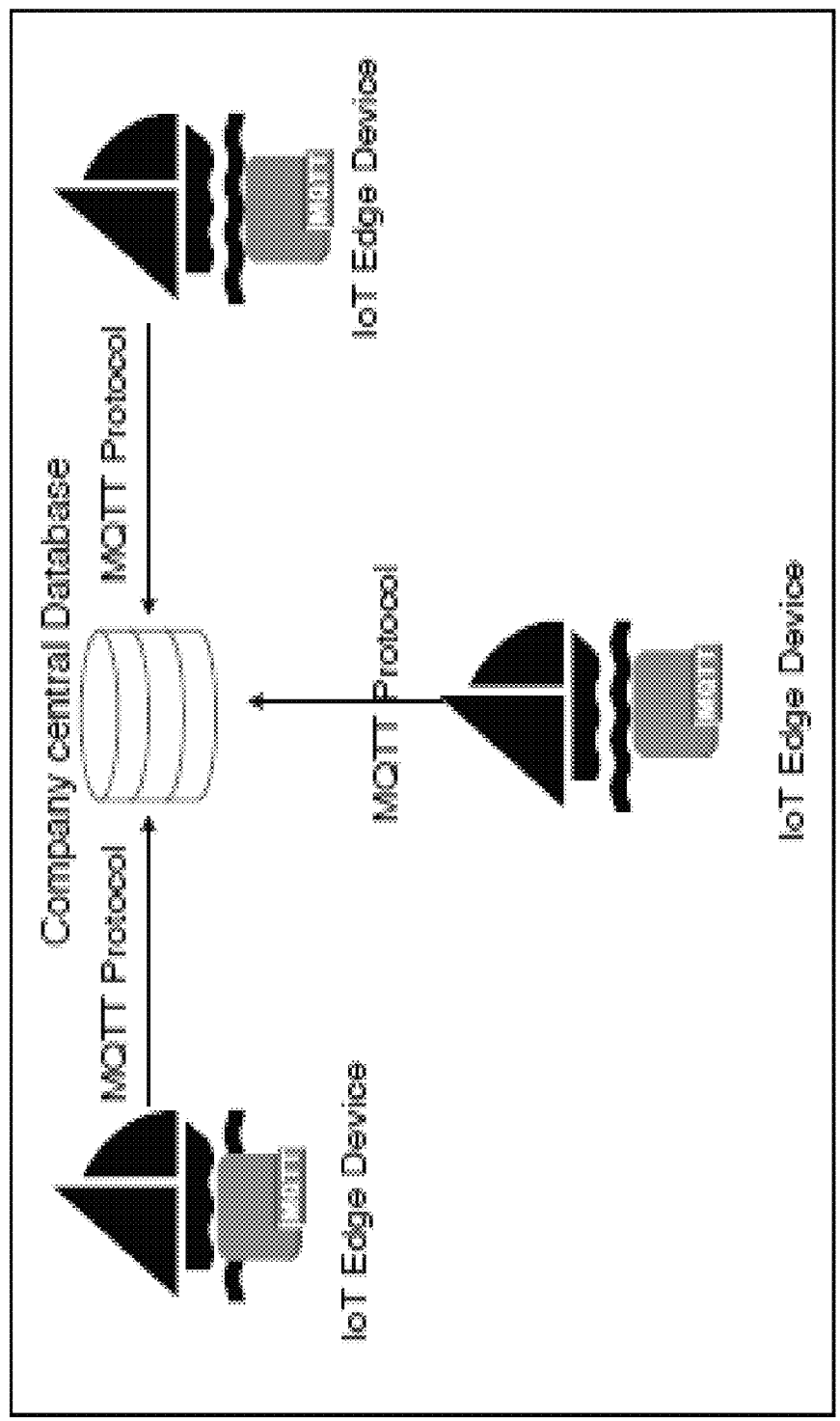
FIG. 6 is a graphic representing communication between IoT edge devices and a company central database in accordance with certain embodiments of the subject invention.

A sample system model according to certain embodiments of the subject invention is shown in FIG. 6 where an IoT Edge Device aboard each of three remote boats transmits data collected on that boat (e.g., over a CAN bus protocol from various sensors on that boat) via a transfer protocol (e.g., MQTT) to a Company Central Database.

In some embodiments of the subject invention, the security of the proposed forensic framework may depend on the secure implementation of a multi-level and multi-chain system. Therefore, certain embodiments of the subject invention consider the following threats (i.e., Threat 1, Threat 2, Threat 3, and Threat 4) to the security of the proposed approach in order to identify the relevant security goals. Certain embodiments of the subject invention contemplate that one or more IoT edge devices may be tamper-proof (e.g., through Hardware Security Modules (HSMs) that provide device-level controls to protect deployed IoT devices.) Alternative methods of preventing or identifying IoT edge device infiltration are also contemplated, such as other methods for hardware security including physically unclonable functions (PUF), tamper proof physical storage, and secure chip and processors.

Threat 1: In this scenario, the attacker disguises itself as an IoT edge device for pushing false IoT data into our multi-chain system by inferring the private keys that are used to sign the data.

Threat 2: In mining-based consensus protocols, all the data is kept in the memory pools (mempools) and miners choose transactions from this memory area. In other words, the mempool is the node's waiting room for all the unconfirmed transactions. Each blockchain node has a different mempool size for stocking the transactions. Thus, each node has a different version of the pending transactions. This creates a variety of pending transactions on different nodes in a distributed manner. If the size of unconfirmed transactions becomes too large to fit in memory, the miners independently remove some of the pending transactions from their mempool. In order to do so, miners generally remove the transactions that pay less transaction fees to boost their earning from mining. In this scenario, the attacker attacks the mempool and gets the transactions which have the hash values to be removed or delayed.

Threat 3: In this attack scenario, the attacker attacks the IoT device communication layer and performs a man-in-the-middle (MitM) attack for altering the transactions.

Threat 4: In this attack scenario, the attacker can counterfeit data in a second level blockchain (e.g., Ethereum).

Certain embodiments of the subject invention seek an efficient solution for a corporate or civil entity (e.g., a boat rental company) which aims to store sensor data (e.g., data collected from its boats) in a such a way that it can prove the integrity of data in future retrievals. A secure integrity mechanism will provide multiple benefits (e.g., not only reduce insurance rates but also help in quickly resolving potential disputes with customers.)

There may be different options to provide a secure integrity mechanism by leveraging blockchain technology. As mentioned, blockchain is a promising environment to verify and prove the integrity of prerecorded data. It has great potential specifically for insurance industry since registering important data will be beneficial in resolving disputes among stakeholders. Therefore, one option would be to construct a permissioned blockchain among stakeholders. This type of solution is applicable when multiple untrusting parties want to share information. For instance, raw material provider, manufacturer, transporter, seller in a supply-chain link can create a consortium for data provenance and integrity. IBM's Hyper ledger as discussed in Cachin (Architecture of the hyperledger blockchain fabric, In Workshop on distributed cryptocurrencies and consensus ledgers (Vol. 310, p. 4) July 2016), which is hereby incorporated by reference herein in its entirety, is designed for this type of business case. For the case of boat rental insurance, the insurance companies may not be cooperative due to management costs and the resulting increases in cost and complexity may render this option unfeasible. However, since the rental company still wants to store data in an immutable way, utilizing a public a blockchain could be an option.

Therefore, another solution could be to write the data directly to a second level blockchain (e.g., Ethereum) network which is a highly secure blockchain platform. It may be required to have a stake worth billions of dollars to justify the effort required to make a 51% attack. However, writing every single transaction on a second level blockchain will be highly costly considering the number of transactions in IoT cases. A second level blockchain might be feasible for some other cases such as asset transfer utilizing a smart contract. For instance, when the ownership of a car is transferred, the money transfer will be completed. However, in cases where frequent transactions are needed, writing the data directly to a second level blockchain is not a very cost-efficient method when compared to certain methods of the subject invention.

Another option would be that data is saved in the database and the calculated hash of stored data is written to a second level blockchain (e.g., Ethereum) periodically (i.e., once a day). This will reduce the cost significantly when compared to writing the data directly to a second level blockchain and ensure the data integrity after it is written to blockchain but does not guarantee the data immutability for the duration of the period while the data is residing in the data center database. So, this approach has reduced the security while the cost is lower.

Certain embodiments of the subject invention opt for a more cost-efficient approach that will rely on multiple blockchain networks in a multi-chain framework to maintain higher security standards at a lower cost.

One challenge with traditional forensics mechanisms is the need to maintain an additional trusted authority to ensure the integrity of the data. Regardless of being encrypted or not, if the trusted authority is compromised, it provides an intruder with an origin to compromise the integrity of the data. In addition, a single trusted authority alone cannot stand for an insider attack when it becomes a target of interest.

The framework in accordance with certain embodiments of the subject invention alleviates the trust issue and establishes a trustless setup by utilizing the blockchain technology. However, storing data on public blockchain is both expensive and has lots of privacy concerns. Even though a boat rental company can maintain only the hash of the data in the blockchain to compare it with the actual data on its database during forensic investigations, keeping just the hash of IoT event data on a secure and public blockchain still costs a lot of money in the long run as will be shown in the Examples below.

Therefore, certain embodiments of the subject invention advantageously utilize affordable alternatives for public blockchains. Although Bitcoin and Ethereum are the most popular and sustainable blockchain platforms, there are many others such as Stellar and EOS, which have survived for years. While they may not be as reliable as Bitcoin and Ethereum because of the limited number of users and popularity, the cost of using these platforms are significantly lower. Since using only one of these platforms may not be secure, certain embodiments of the subject invention propose a multi-factor integrity (MFI) system that utilizes multiple low-cost blockchain platforms (e.g., Stellar and EOS) together with a second level blockchain (e.g., Ethereum or Bitcoin) to provide a back-up system against system failures. Certain embodiments of the subject invention increase the resiliency of data in case one of the platforms may be discontinued or hacked. MFI makes it more difficult for a malicious actor to alter the IoT data stored in the company's database without detection. If one blockchain is compromised or broken, a malicious actor still has at least one more obstacle to breach the integrity of the data. In certain embodiments one or more of these platforms are smart contract oriented to enable easy communications among each other.

To reduce data size to be written to public blockchains, certain embodiments of the subject invention employ hash functions along with Merkle tree to reduce costs as follows.

1) In the first step, the IoT edge device from a boat submits the hash of IoT data to the first level of the multi-chain system. As previously discussed, only interesting data is picked based on some predefined events or pre-conditions. The hash of this data is written to both first level blockchains (e.g., Stellar and EOS) throughout the time period (e.g., throughout the day) as long as there is interesting data.

2) At a predetermined or event driven point of each time period (e.g., at the end of each day), a synchronization process starts and the data center of the rental company fetches the confirmed transactions which were submitted to the first level blockchains. The data center then builds a Merkle tree from confirmed transactions and computes the Merkle root for each.

3) The Merkle root computed in the previous step represents another integrity factor. Thus, it is submitted to a more secure and reliable blockchain, e.g., a second level blockchain, and a copy of it is stored in a local database to be used during forensic investigations. A second level blockchain is used only for the hash of all hashes in a given time period (e.g., during a day) to save transaction costs. The proposed overall architecture is shown in FIG. 1.

Turning now to the Integrity Verification Process, when there is an incident that creates dispute (e.g., as to who is responsible), certain embodiments of the subject invention will be used to validate the recorded data. For example, an insurance company working on a claim or a law enforcement officer working on an accident scene needs to ensure the integrity of the available data. Once the integrity of the data is ensured, the faulty party can be determined with higher confidence.

In order to do so, considering the framework in accordance with certain embodiments of the subject invention, the investigator/officer first accesses the related forensic data that is stored in the data center. The investigator/officer will then need to collect the submitted transactions that contain the hash of the data to the first level blockchains, related Merkle root values and Merkle paths of those transactions.

The details of the process according to certain embodiments of the subject invention are shown in FIG. 2. In this figure, the data center contains a row for each event data which includes: 1) the original IoT data; 2) The transaction created with the hash of this data; 3) The Merkle path nodes for this data; and 4) The Merkle root.

Transaction 1 (Tx1) contains the hash of an event data that is already stored in the data center. The investigator/officer can trust the event data if it exists in the first level blockchain. The hash of the event data is computed and this hash is compared with the value in Tx1 in the first level blockchain (e.g., EOS and/or Stellar.)

Then, the investigator/officer may choose to validate the input transactions again on a second level blockchain (e.g., Ethereum). In order to validate Tx1 and ensure that it exists within the Merkle path, the investigator/officer needs to check whether the provided Merkle root which contains the Tx1 and given Merkel root M1 is equal to the value stored in a second level blockchain. To do so, the investigator/officer simply needs to compute the hash of Tx1 that acts as a node in the Merkle tree provided by the data center. With the given nodes in its Merkle path, the investigator/officer can simply and very quickly calculate M1 (i.e., the Merkle root to which Tx1 belongs) by series of hash operations with SV method as described above. If the calculated Merkle root by investigator is equal to the provided M1, the investigator/officer ensures that the path in the Merkle tree is correct and Merkle root M1 contains Tx1.

If the computed Merkle root and the value which is saved in the a second level blockchain matches, the investigator/officer knows with certainty that the data center has given him/her a valid/tamper-proof IoT hash data. The investigator/officer also knows that the existence of the transaction in the blockchain has been validated by different multi-chain miners and that there is an extensive PoW/computation time ensuring the integrity of the hash data in the multi-chain system. The overall process of verification is shown in FIG. 2.

As used herein, the terms "about" and "approximately" shall generally mean an acceptable degree of error for the quantity measured given the nature or precision of the measurements. Exemplary degrees of error are within 20 percent (%), typically, within 10%, and more typically, within 5% of a given value or range of values. As used herein, the term "and/or" should be understood to mean "either or both" of the features so conjoined, i.e., elements that are conjunctively present in some cases and disjunctively present in other cases.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable (or machine-readable) media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention. It should be understood that the examples and embodiments described herein are for illustrative purposes only and that various modifications or changes in light thereof will be suggested to persons skilled in the art and are to be included within the spirit and purview of this application.

Turning now to evaluate a proposed framework in accordance with certain embodiments of the subject invention in terms of its associated costs and performance; an experimental setup, benchmarks, cost analysis, and security performance analysis are discussed below.

Example 1—Establishment of a Multi-Level Blockchain Framework

In order to perform transactions in each of the mentioned blockchain platforms, their respective nodes were created. First, an EOS central node was set up, to which nodes are supposed to connect through the EOS chain plugin API. Every node (boats in this example) has its wallet and uses this wallet to connect to main EOS Network. When there is any interesting event, the IoT edge device pushes the hash of this value into EOS Blockchain via Central EOS Node. In this setup, it is possible for each wallet to track all transactions easily via history API plugin. Similarly, Stellar wallets were installed to connect to its network using theirs APIs.

Events waiting for API recalls were used to trigger smart contracts, which become ready to be deployed to a second level blockchain (e.g., Ethereum) after checking validity. An event is an interface between wallet, API, and smart contracts. Javascript API connects to Web3 interface of a second level blockchain client that hosts the smart contract, and triggers the hash deployment event. The triggered function imports the Merkle root data as constructed and creates a transaction for a wallet (e.g., Metamask wallet) by a second level blockchain. The Metamask wallet broadcasts metadata of the contract to a second level blockchain network via peers, and wait for one miner to put the smart contract into a block.

TABLE I

| Blockchain | Transactioin Cost | | |
|---|---|---|---|
| | Unit Cost | Cost in $ | Time |
| EOS | 100 EOS (once) | $0.00063 | <1 min |
| Stellar | 0.001 Lumen | $0.000054 | <1 min |
| Ethereum (contr) | 0.000131 ETH | $0.019 | 12 min |
| Ethereum | 0.000025 ETH | $0.0036 | 10 min |

Example 2—Establishment of Benchmarks

The approach of embodiments of the subject invention was compared with two other approaches as described below.

Second level blockchain (e.g., Ethereum) with new Contract: This approach creates a new a second level blockchain contract for each hash and inserts the hash in this contract. Creating a new contract for each piece of data is costly but it is a simple and secure way to store data in a second level blockchain.

Function Call from a second level blockchain (e.g., Ethereum) Contract: This approach deploys a second level blockchain contract by including a function, and thus each time this function is called to save the hash instead of creating a new contract. Making a function call is a cheaper process than a new contract deployment since the contract creator pays only the contract creation fee once. However, when one smart contract is deployed and its function is called to save a new hash value, it becomes less secure. The attacker can directly attack a particular contract instead of hundreds of them.

Example 3—Cost Analysis

The cost associated with the framework of embodiments of the subject invention was assessed by comparing it with the benchmarks mentioned. Before doing the complete cost analysis, the unit transaction costs associated with each blockchain platform were provided and measured for a function call to save a hash value along with the transaction verification time in Table I. It can be observed that a second level blockchain (e.g., Ethereum) unit price, even deployed with the minimum gas fee, is much higher than others. It should also be noted that EOS provides free contract deployment, but it requires to have 100 EOS in the node. Regarding the validation times, EOS and Stellar are much faster for real-time transactions. A second level blockchain (e.g., Ethereum) on the other hand is slow but since it is used at the end of the day on already stored transactions, this may be an acceptable compromise.

In doing the computations for this example, it was assumed that each boat sends 10 significant data every day throughout one year and there are 1000 boats owned by the company. Table II lists the costs associated with our proposed approach. It lists the costs relating to first level of blockchain (i.e., EOS and Stellar) for 1000 boats. For a second level blockchain (e.g., Ethereum), because only the summary of data coming from EAS and Stellar is written, there are only 2 per day. The total cost for our approach comes to $443.

TABLE II

Multichain cost calculation

| Blockchain Network | # of boats | Data point | Total Cost in $ |
| --- | --- | --- | --- |
| EOS | 1000 | 10x365 | $232 |
| Stellar | 1000 | 10x365 | $197 |
| Ethereum | — | 2x365 | $14 |
| Grand total | | | $443 |

Table III lists the costs associated with other approaches compared to an embodiment of the subject invention. As can be seen, the cost of a second level blockchain (e.g., Ethereum) only approach is very expensive (e.g., around $70K). While it is highly secure and reliable, it will not be attractive for the boat company to deploy. The other a second level blockchain (e.g., Ethereum) approach with function calls turn out to be much more affordable around $13K. The contract deployment cost is a one-time cost and the hashes are always written to this contract. Nevertheless, this is still much more expensive compared to the multichain cost of $443. The savings with the multichain approach is significant and can be very attractive for the company to deploy.

TABLE III

Cost Comparison

| Aprroach | Total Cost in $ |
| --- | --- |
| Multichain (EOS + Stellar + Ethereum) | $443 |
| Ethereum only (func. call) | $13140 |
| Ethereum only (new contract) | $69350 |

Example 4—Security Analysis of Four Threat Scenarios

The attacks mentioned in the Threat Model above were considered, and how the framework of embodiments of the subject invention addresses these attacks was considered.

Threat 1: In this scenario, the attacker tries to masquerade IoT device for pushing bogus IoT data into our multi-chain system. To do so, the attacker needs to derive the different private keys of IoT edge device that are used in EOS, Stellar and data center. It can be argued that even if the attacker may obtain one or more of these keys, the attack can be thwarted due to our MFI design. Any inconsistency between pushed data can be easily detected by the data center with a simple check. This means, the attacker needs to obtain all of the keys, which is very unlikely. Note that, the stolen private key attack can be opted-out by assuming that HSM is deployed in IoT edge devices.

Threat 2: Considering mentioned mempool features, the attacker may try to delete the transaction from the mempool. However, it is almost impossible because transaction pool is held by every node separately and the only way to delete these transactions is to remove them from all nodes in the network which means accomplishing a 51% attack continuously for all blockchains in our multi-chain framework.

Another possibility is that the attacker can make too many bogus transactions with higher transaction fees to force nodes to remove the less paid transactions from their mempool. This attack has three main drawbacks. First, the attacker should invest huge amount of money to create enough bogus trans-actions to fill the mempools of all nodes for each blockchain. Second, this attack does not guarantee that only the related transactions (i.e., the ones which hold the IoT hash values) will be removed from the mempool. Third, IoT device or data center can redo transactions if it is not confirmed within a reasonable time period.

Threat 3: In this attack scenario, the attacker may perform MitM attack between Blockchain peers and IoT edge devices. If the attack is successful, that means for both of the two mid-size Blockchain networks (i.e., EOS and Stellar), the attacker can block the transactions. However, at the end of the day when the data center is fetching the transactions to build the Merkle tree, the data center can easily figure out the problem and inform IoT edge device to push their IoT hash transactions again by using different EOS and/or Stellar nodes.

Threat 4: In the framework, a second level blockchain (e.g., Ethereum) acts as an unbreakable seal to provide a long-term integrity ensuring mechanism for forensic investigations. This is due the fact that, a second level blockchain (e.g., Ethereum) is a huge blockchain network which contains more than 10,000 full nodes. This makes a second level blockchain (e.g., Ethereum) very secure against the 51% attacks since the cost of such an attack is around $400,000 per hour for now [23]. Thus, changing an old transaction, in other worlds, rollbacking will be worth $400K×hours depending on how old the transaction is. To change old transaction, the attacker must create a new and longer chain starting from the target block. a second level blockchain (e.g., Ethereum) network has 215 TH/s hash rate, which is very high. To change old data in a second level blockchain (e.g., Ethereum) network requires calculating this difficulty from scratch for each succeeding blocks continuously.

Certain embodiments of the subject invention include a forensics framework that consists of multiple blockchain networks in two or more layers. Although embodiments of the subject invention have been discussed primarily in reference to a two layer framework, a third layer and/or additional layers are contemplated as means to improve security or reliability while reducing costs. One benefit of the system is to verify authenticity and integrity of the data collected from various IoT devices or other distributed or remote sources in case of possible disputes. Certain embodiments of the subject invention collaboratively use multiple blockchains to create a more secure and tamper-resistant yet affordable system. In order to reduce the size of the data, certain embodiments of the subject invention utilized hashes as well as Merkle tree to only store hash of hashes at the end of each reporting period (e.g., each day.)

Cost analysis with the actual prices obtained from three well-known blockchain networks and the security features of the design have been analyzed by considering possible attack scenarios. The results indicated that a multi-layer framework in accordance with the subject invention reduces the costs significantly and makes it attractive to be used in commerce. Embodiments of the subject invention contemplate further improvement by including additional low-cost blockchain platforms and other secure storage systems or methods as they become available in the future to increase the resistance against possible attacks.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for verifying authenticity and integrity of data collected from one or more devices during one or more time periods, the system comprising:
   at least one processor; and
   at least one machine-readable medium in operable communication with the at least one processor, the at least one machine-readable medium having instructions stored thereon that, when executed by the at least one processor, perform the following steps:
   collecting one or more data entries;
   encoding, to a primary blockchain, a primary hash created from each data entry, respectively, of the one or more data entries;
   encoding, to at least one secondary blockchain, a secondary hash of each primary hash, respectively, encoded to the primary blockchain, the secondary hash being encoded as a Merkle root of a Merkle tree comprising each of the primary hashes encoded to the primary blockchain, and the Merkle tree comprising a set of Merkel Path Nodes; and
   writing, within a database, an individual database entry associating each data entry of the one or more data entries with its respective primary hash, Merkle root, and set of Merkle Path Nodes related to that data entry.

2. The system according to claim 1, the instructions when executed further performing the following steps:
   reading, from the database entry within the database, a first data entry of the one or more data entries, the primary hash related to the first data entry, the Merkle root related to the first data entry, and the set of Merkle Path Nodes related to the first data entry;
   reading, from the primary blockchain, the primary hash created from the first data entry;
   reading, from the secondary blockchain, the Merkle root encoding the secondary hash related to the first data entry;
   comparing the primary hash read from the database entry with the primary hash read from the primary blockchain; and
   comparing the Merkle root read from the secondary blockchain with a Merkle root calculated from the primary hash related to the first data entry, the Merkle root related to the first data entry, and the set of Merkle Path Nodes related to the first data entry.

3. The system according to claim 2, the primary blockchain having a measurable primary unit transaction cost, a measurable primary transaction verification time, and a measurable primary security level,
   the secondary blockchain having a measurable secondary unit transaction cost, a measurable secondary transaction verification time, and a measurable secondary security level,
   the primary security level being lower than the secondary security level, and
   (1) the primary unit transaction cost being lower than the secondary unit transaction cost, (2) the primary unit verification time being lower than the secondary unit verification time, or both.

4. The system according to claim 3, the primary blockchain being a first primary blockchain, and the instructions when executed further performing the following steps:
   encoding, to a second primary blockchain, a tertiary hash created from each data entry, respectively, of the one or more data entries;
   reading, from the second primary blockchain, the tertiary hash created from the first data entry; and
   comparing the primary hash read from the database entry with the tertiary hash read from the second primary blockchain.

5. The system according to claim 4, each of the first primary blockchain, the second primary blockchain, and the secondary blockchain being a public permission-less blockchain allowing open access and initiation of contracts.

6. The system according to claim 4, the one or more data entries comprising event data generated by one or more sensors.

7. The system according to claim 6, further comprising an IoT edge device comprising a processor of the at least one processor and configured to communicate with: (1) one or more sensors within a local environment using one or more local communication protocols; and (2) one or more instances of a database or a blockchain hosted in a location remote to the IoT edge device, using one or more remote communications protocols.

8. The system according to claim 7, the IoT edge device being mounted on an operational vehicle or vessel.

9. The system according to claim 8, the one or more local communication protocols comprising a Controller Area Network (CAN), and the one or more remote communications protocols comprising Message Queuing Telemetry Transport (MQTT) protocol.

10. The system according to claim 9, the operational vehicle or vessel being a boat.

11. A method for providing verification of authenticity and integrity of data collected from one or more devices during one or more time periods, the method comprising:
    providing at least one first processor in operable communication with a data source, a primary blockchain, a secondary blockchain, and a database;
    collecting, by the at least one first processor, one or more data entries from the data source;
    encoding, by the at least one first processor, to the primary blockchain, a primary hash created from each data entry, respectively, of the one or more data entries;
    encoding, by the at least one first processor, to the secondary blockchain, a secondary hash of each primary hash, respectively, encoded to the primary blockchain, the secondary hash being encoded as a Merkle root of a Merkle tree comprising each of the primary hashes encoded to the primary blockchain, and the Merkle tree comprising a set of Merkel Path Nodes;
    writing, by the at least one first processor, within the database, an individual database entry associating each data entry of the one or more data entries with its respective primary hash, Merkle root, and set of Merkle Path Nodes related to that data entry to create a digital forensics framework; and
    providing, by the at least one first processor, the digital forensics framework, thereby providing the verification of authenticity and integrity of data collected from one or more devices during one or more time periods.

12. The method according to claim 11, further comprising the following steps:
    providing at least one second processor in operable communication with the data source, the primary blockchain, the secondary blockchain, and the database;

reading, by the at least one second processor, from a database entry within the database, a first data entry of the one or more data entries, the primary hash related to the first data entry, the Merkle root related to the first data entry, and the set of Merkle Path Nodes related to the first data entry;

reading, by the at least one second processor, from the primary blockchain, the primary hash created from the first data entry;

reading, by the at least one second processor, from the secondary blockchain, the Merkle root encoding the secondary hash related to the first data entry;

comparing, by the at least one second processor, the primary hash read from the database entry with the primary hash read from the primary blockchain; and comparing, by the at least one second processor, the Merkle root read from the secondary blockchain with a Merkle root calculated from the primary hash related to the first data entry, the Merkle root related to the first data entry, and the set of Merkle Path Nodes related to the first data entry.

13. The method according to claim 12,
the primary blockchain having a measurable primary unit transaction cost, a measurable primary transaction verification time, and a measurable primary security level,
the secondary blockchain having a measurable secondary unit transaction cost, a measurable secondary transaction verification time, and a measurable secondary security level,
the primary security level being lower than the secondary security level, and
(1) the primary unit transaction cost being lower than the secondary unit transaction cost, (2) the primary unit verification time being lower than the secondary unit verification time, or both.

14. The method according to claim 13, the primary blockchain being a first primary blockchain, and further performing the following steps:
encoding, by the at least one first processor, to a second primary blockchain, a tertiary hash created from each data entry, respectively, of the one or more data entries;
reading, by the at least one second processor, from the second primary blockchain, the tertiary hash created from the first data entry; and
comparing, by the at least one second processor, the primary hash read from the database entry with the tertiary hash read from the second primary blockchain.

15. The method according to claim 14, each of the first primary blockchain, the second primary blockchain, and the secondary blockchain being a public permission-less blockchain allowing open access and initiation of contracts.

16. The method according to claim 14, the one or more data entries comprising event data generated by one or more sensors.

17. The method according to claim 16, the step of collecting one or more data entries further comprising collecting one or more data entries from an IoT edge device configured to communicate with: (1) one or more sensors within a local environment using one or more local communication protocols; and (2) one or more instances of a database or a blockchain hosted in a location remote to the IoT edge device, using one or more remote communications protocols.

18. The method according to claim 17, the IoT edge device being mounted on an operational vehicle or vessel.

19. A system for verifying authenticity and integrity of data collected from one or more devices during one or more time periods, the system comprising:
at least one processor; and
at least one machine-readable medium in operable communication with the at least one processor, the at least one machine-readable medium having instructions stored thereon that, when executed by the at least one processor, perform the following steps:
collecting one or more data entries;
encoding, to a first primary blockchain, a primary hash created from each data entry, respectively, of the one or more data entries;
encoding, to at least one secondary blockchain, a secondary hash of each primary hash, respectively, encoded to the first primary blockchain, the secondary hash being encoded as a Merkle root of a Merkle tree comprising each of the primary hashes encoded to the first primary blockchain, and the Merkle tree comprising a set of Merkel Path Nodes;
writing, within a database, an individual database entry associating each data entry of the one or more data entries with its respective primary hash, Merkle root, and set of Merkle Path Nodes related to that data entry;
reading, from a database entry within the database, a first data entry of the one or more data entries, the primary hash related to the first data entry, the Merkle root related to the first data entry, and the set of Merkle Path Nodes related to the first data entry;
reading, from the first primary blockchain, the primary hash created from the first data entry;
reading, from the secondary blockchain, the Merkle root encoding the secondary hash related to the first data entry;
comparing the primary hash read from the database entry with the primary hash read from the first primary blockchain; and
comparing the Merkle root read from the secondary blockchain with a Merkle root calculated from the primary hash related to the first data entry, the Merkle root related to the first data entry, and the set of Merkle Path Nodes related to the first data entry;
encoding, to a second primary blockchain, a tertiary hash created from each data entry, respectively, of the one or more data entries;
reading, from the second primary blockchain, the tertiary hash created from the first data entry; and
comparing the primary hash read from the database entry with the tertiary hash read from the second primary blockchain;
the first primary blockchain having a measurable primary unit transaction cost, a measurable primary transaction verification time, and a measurable primary security level,
the secondary blockchain having a measurable secondary unit transaction cost, a measurable secondary transaction verification time, and a measurable secondary security level,
the primary security level being lower than the secondary security level,
(1) the primary unit transaction cost being lower than the secondary unit transaction cost, (2) the primary unit verification time being lower than the secondary unit verification time, or both, and
each of the first primary blockchain, the second primary blockchain, and the secondary blockchain being a public permission-less blockchain allowing open access and initiation of contracts.

20. The system according to claim 19, the one or more data entries comprising event data generated by one or more sensors, and the system further comprising:
- an IoT edge device mounted on an operational boat, the IoT edge device comprising a processor of the at least one processor and configured to communicate with: (1) one or more sensors within a local environment using one or more local communication protocols; and (2) one or more instances of a database or a blockchain hosted in a location remote to the IoT edge device, using one or more remote communications protocols comprising a Controller Area Network (CAN), and a Message Queuing Telemetry Transport (MQTT) protocol.

* * * * *